United States Patent
Jin et al.

(10) Patent No.: US 9,910,539 B2
(45) Date of Patent: Mar. 6, 2018

(54) METHOD AND APPARATUS FOR CONTROLLING FLEXIBLE DISPLAY AND ELECTRONIC DEVICE ADAPTED TO THE METHOD

(71) Applicant: Samsung Electronics Co., Ltd., Suwon-si, Gyeonggi-do (KR)

(72) Inventors: Youngtae Jin, Hwaseong-si (KR); Kichul Kim, Seongnam-si (KR); Moonyoung Woo, Suwon-si (KR); Sunmuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/605,431

(22) Filed: Jan. 26, 2015

(65) Prior Publication Data

US 2015/0220195 A1    Aug. 6, 2015

(30) Foreign Application Priority Data

Feb. 5, 2014   (KR) ........................ 10-2014-0013137

(51) Int. Cl.
*G06F 3/041*   (2006.01)
*G06F 1/16*   (2006.01)
*G06F 3/0488*   (2013.01)

(52) U.S. Cl.
CPC .......... *G06F 3/0418* (2013.01); *G06F 1/1643* (2013.01); *G06F 1/1652* (2013.01); *G06F 3/0488* (2013.01); *G06F 2203/04102* (2013.01); *G09G 2340/045* (2013.01); *G09G 2380/02* (2013.01)

(58) Field of Classification Search
CPC .... G06F 3/0412; G06F 3/0488; G06F 1/1652; G06F 3/0418; G06F 1/1643; G06F 2203/04102; G06F 3/041–3/047; G09G 2340/045; G09G 2380/02
USPC ..................... 178/18.01–19.07; 345/173–178
See application file for complete search history.

(56) References Cited

U.S. PATENT DOCUMENTS

| | | | |
|---|---|---|---|
| 7,443,380 B2 | 10/2008 | Nozawa | |
| 8,271,047 B2 | 9/2012 | Kim et al. | |
| 2007/0242033 A1 | 10/2007 | Cradick et al. | |
| 2008/0291225 A1 | 11/2008 | Arneson | |
| 2009/0315848 A1 | 12/2009 | Ku et al. | |
| 2012/0098783 A1* | 4/2012 | Badaye | G06F 3/044 345/174 |
| 2012/0169609 A1 | 7/2012 | Britton | |
| 2013/0162556 A1 | 6/2013 | Yu | |
| 2013/0257775 A1 | 10/2013 | Lee | |

(Continued)

FOREIGN PATENT DOCUMENTS

KR   10-2010-0001017 A   1/2010
KR   10-2013-0015542 A   2/2013

*Primary Examiner* — Michael Pervan
(74) *Attorney, Agent, or Firm* — Jefferson IP Law, LLP

(57) ABSTRACT

A method and an apparatus for controlling a flexible display, and an electronic device adapted to the method are provided. The method includes determining, when a user input is made while screen display data is displayed on the flexible display, whether the flexible display includes a bent area, calculating, when the flexible display includes the bent area, coordinates from the bent area and a bent angle, and compensating data displayed on the bent area with preset compensation and displaying the data.

20 Claims, 9 Drawing Sheets

(56) References Cited

U.S. PATENT DOCUMENTS

2014/0002419 A1    1/2014  Thorson et al.
2014/0043263 A1*  2/2014  Park ..................... G06F 3/0418
                                                            345/173

* cited by examiner

METHOD AND APPARATUS FOR CONTROLLING FLEXIBLE DISPLAY AND ELECTRONIC DEVICE ADAPTED TO THE METHOD

CROSS-REFERENCE TO RELATED APPLICATION(S)

This application claims the benefit under 35 U.S.C. § 119(a) of a Korean patent application filed on Feb. 5, 2014 in the Korean Intellectual Property Office and assigned Serial No. 10-2014-0013137, the entire disclosure of which is hereby incorporated by reference.

TECHNICAL FIELD

The present disclosure relates to systems for controlling displays. More particularly, the present disclosure relates to a method and apparatus for controlling a flexible display and to an electronic device adapted to the method.

BACKGROUND

With the rapid development of technology, electronic devices such as smartphones, tablet personal computers (tablet PCs), etc., have been equipped with a variety of functions (e.g., wireless voice calling, information exchanging, etc.) and their use has therefore increased. Electronic devices have been developed to be small in size, while at the same time employing a larger-sized screen to display more information. This has led to the development of flexible displays. Flexible displays are displays that are made of materials that are flexible in nature, like paper, and provide the displaying function although they are in a bent state.

Due to such features of flexible displays, users can fold them while in transit and unfold them while in use. Flexible displays can thus provide the convenience of use and portability to users.

In recent years, touch screen displays have been developed to be flexible, which are called flexible touch screen displays, and applied to electronic devices. Electronic devices with a flexible touch screen display according to the related art are, however, disadvantageous because the user cannot clearly see contents at the position or coordinates on the bent portion of the screen. Electronic devices according to the related art are also disadvantageous because the user cannot easily make a touch on a bent portion of the flexible touch screen. Therefore, electronic devices with a flexible touch screen display according to the related art need a system for allowing users to clearly see contents (coordinates) on and to easily apply touches to the screen, according to the bent position and the extent of bending.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for controlling a flexible display to perform a displaying operation, allowing users to easily apply inputs to an electronic device with the flexible display.

Another aspect of the present disclosure is to provide a method and apparatus for controlling a flexible display to perform a displaying operation, allowing users to easily check information about a bent position on the flexible display.

In accordance with an aspect of the present disclosure, a method for controlling a flexible display of an electronic device is provided. The method includes determining, when a user input is made while screen display data is displayed on the flexible display, whether the flexible display includes a bent area, calculating, when the flexible display includes the bent area, coordinates from the bent area and a bent angle, and compensating data displayed on the bent area with preset compensation and displaying the data.

In accordance with another aspect of the present disclosure, a method for controlling a flexible display of an electronic device is provided. The method includes determining, after creating screen display data to be displayed on the flexible display, whether the flexible display includes a bent area, calculating, when the flexible display includes the bent area, coordinates from the bent area and a bent angle, and compensating data displayed on the bent area with preset compensation and displaying the data.

In accordance with another aspect of the present disclosure, an electronic device is provided. The electronic device includes a flexible display for displaying screen display data, detecting a user input, and detecting information about a portion and an angle of a bent area, a memory for storing data for compensating bent regions of the flexible display, and a processor for creating data to be displayed on the flexible display, controlling the flexible display to display the data, determining, when detecting a user input from the flexible display, whether the flexible display includes the bent area, calculating, when the flexible display includes the bent area, coordinates from the bent area and a bent angle, compensating data displayed on the bent area with preset compensation, and displaying the data on the flexible display.

In accordance with another aspect of the present disclosure, an electronic device for controlling a flexible display of an electronic device is provided. The electronic device includes a flexible display for displaying screen display data, detecting a user input, and detecting information about a portion and an angle of a bent area, a memory for storing data for compensating bent regions of the flexible display, and a processor for determining, after creating screen display data to be displayed on the flexible display, whether the flexible display includes the bent area, calculating, when the flexible display includes the bent area, coordinates from the bent area and a bent angle, and compensating data displayed on the bent area with preset compensation and displaying the data on the flexible display.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
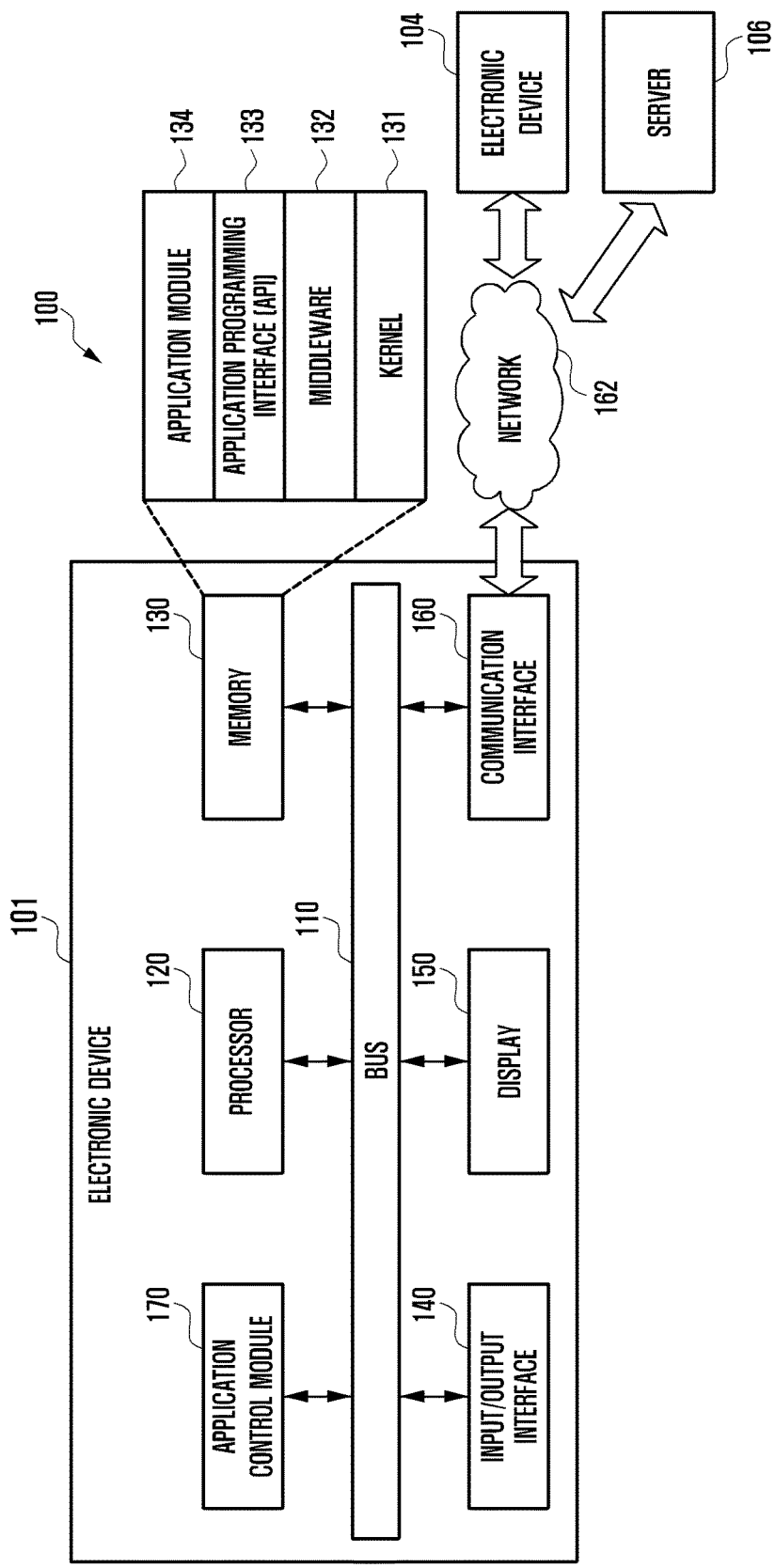
FIG. 1 illustrates a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Expressions such as "include" and "may include," which may be used in the present disclosure, denote the presence of the disclosed functions, operations, and constituent elements and do not limit one or more additional functions, operations, and constituent elements. In the present disclosure, the terms such as "include" and/or "have" may be construed to denote a certain characteristic, number, operation, constituent element, component or a combination thereof, but may not be construed to exclude the existence of or a possibility of the addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although for both of them the first user device and the second user device are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also another component may exist between the component and the other component. Meanwhile, in the case where according to which a component is referred to as being "directly connected" or "directly accessed" to other component, it should be understood that there is no component therebetween. The terms used in the present disclosure are only used to describe specific various embodiments, and are not intended to limit the present disclosure.

Unless otherwise defined, all terms including technical and/or scientific terms used herein have the same meaning as commonly understood by one of ordinary skill in the art to which the present disclosure pertains. In addition, unless otherwise defined, all terms defined in generally used dictionaries may not be overly interpreted.

An electronic device according to the present disclosure may be a device including a communication function. For example, the electronic device may include at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device. Examples of a wearable device are a head-mounted-device (HMD) (e.g., electronic eyeglasses), electronic clothing, an electronic bracelet, an electronic necklace, an electronic accessory, an electronic tattoo, a smart watch, etc.

In addition, an electronic device according to an embodiment of the present disclosure may be smart home appliances including a communication function. Home appliances may include at least one of for example, a television (TV), a Digital Video Disk (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic album, or the like.

An electronic device according to various embodiments of the present disclosure may include at least one of various medical devices (e.g., Magnetic Resonance Angiography (MRA), Magnetic Resonance Imaging (MRI), Computed Tomography (CT), a scanning machine, an ultrasonic wave device, etc.), a navigation device, a Global Positioning System (GPS) receiver, an Event Data Recorder (EDR), a Flight Data Recorder (FDR), a vehicle infotainment device, an electronic equipment for ships (e.g., navigation equipment, gyrocompass, etc.), avionics, a security device, a head unit for vehicle, an industrial or home robot, an automatic teller's machine (ATM), a point of sales (POS) system, etc.

An electronic device according to various embodiments of the present disclosure may include at least one of furniture or a portion of a building/structure, an electronic board, an electronic signature receiving device, a projector, various measuring instruments (e.g., a water meter, an electric meter, a gas meter and a wave meter), etc., which have a communication function, respectively. An electronic device according to the present disclosure may also include a combination of the components listed above. In addition, an electronic device according to the present disclosure may be a flexible device. It is obvious to those skilled in the art that the electronic device according to the present disclosure is not limited to the aforementioned devices.

Hereinafter, electronic devices according to various embodiments of the present disclosure are described with reference to the accompanying drawings. In the description, the term a 'user' is referred to as a person or a device that uses an electronic device, e.g., an artificial intelligent electronic device.

FIG. 1 illustrates a network environment including an electronic device according to an embodiment of the present disclosure.

Referring to FIG. 1, the network environment 100 includes the electronic device 101, which may include a bus 110, a processor 120, a memory 130, an input/output (I/O) interface 140, a display 150, a communication interface 160 and an application control module 170.

The bus 110 may be a communication circuit that connects the components to each other and transfers data (e.g., control messages) between the components.

The processor 120 may receive instructions from the components (e.g., the memory 130, the I/O interface 140, the display 150, the communication interface 160, the application control module 170, etc.) via the bus 110, decode them and perform corresponding operations or data processing according to the decoded instructions.

The memory 130 may store instructions or data transferred from/created in the processor 120 or the other components (e.g., the I/O interface 140, the display 150, the communication interface 160, the application control module 170, etc.). The memory 130 may include programming modules, e.g., a kernel 131, middleware 132, an application programming interface (API) 133, an application module 134, etc. Each of the programming modules may be software, firmware, hardware or a combination thereof.

The kernel 131 may control or manage system resources (e.g., the bus 110, processor 120, memory 130, etc.) used to execute operations or functions of the programming modules, e.g., the middleware 132, the API 133, and the application module 134. The kernel 131 may also provide an interface that can access and control/manage the components of the electronic device 101 via the middleware 132, the API 133, and the application module 134.

The middleware 132 may make it possible for the API 133 or the application module 134 to perform data communication with the kernel 131. The middleware 132 may also perform control operations (e.g., scheduling, load balancing) for task requests transmitted from the application module 134 by methods, for example, a method for assigning the order of priority to use the system resources (e.g., the bus 110, the processor 120, the memory 130, etc.) of the electronic device 101 to at least one of the applications of the application module 134.

The API 133 is an interface that allows the application module 134 to control functions of the kernel 131 or the middleware 132. For example, the API 133 may include at least one interface or function (e.g., instruction) for file control, window control, character control, video process, etc.

The application module 134 may include applications that are related to a short message service (SMS)/multimedia messaging service (MMS), email, a calendar, an alarm, health care (e.g., an application for measuring the blood sugar level, a workout application, etc.), environment information (e.g., atmospheric pressure, humidity, temperature, etc.), and so on. The application module 134 may be an application related to exchanging information between the electronic device 101 and the external electronic devices (e.g., an electronic device 104). The information exchange-related application may include a notification relay application for transmitting specific information to an external electronic device or a device management application for managing external electronic devices.

For example, the notification relay application may include a function for transmitting notification information, created by the other applications of the electronic device 101 (e.g., SMS/MMS application, email application, health care application, environment information application, etc.), to an external electronic device (e.g., electronic device 104). In addition, the notification relay application may also receive notification information from an external electronic device (e.g., electronic device 104) and provide it to the user. The device management application can manage (e.g., install, delete, update, etc.) part of the functions of an external electronic device (e.g., electronic device 104) communicating with the electronic device 101, e.g., turning on/off the external electronic device, turning on/off part of the components of the external electronic device, adjusting the brightness (or the resolution) of the display of the external electronic device, etc., applications operated in the external electronic device, or services from the external electronic device, e.g., call service or messaging service, etc.

The application module 134 may include applications designated according to attributes (e.g., type of electronic device) of the external electronic device (e.g., electronic device 104). For example, if the external electronic device is a media player (e.g., an MP3 player), the application module 134 may include an application related to music playback. If the external electronic device is a mobile medical device, the application module 134 may include an application related to health care. In an embodiment of the present disclosure, the application module 134 may include at least one of an application designated in the electronic device 101 and applications transmitted from external electronic devices (e.g., a server 106, electronic device 104, etc.).

The I/O interface 140 may receive instructions or data from the user via an I/O system (e.g., a sensor, keyboard or touch screen) and transfer them to the processor 120, memory 130, communication interface 160 or application control module 170 through the bus 110. For example, the I/O interface 140 may provide data corresponding to a user's touch input to a touch screen to the processor 120. The I/O interface 140 may receive instructions or data from the processor 120, memory 130, communication interface 160 or application control module 170 through the bus 110, and output them to an I/O system (e.g., a speaker or a display). For example, the I/O interface 140 may output voice data processed by the processor 120 to the speaker.

The display 150 may display information (e.g., multimedia data, text data, etc.) on the screen so that the user can view it. In various embodiments of the present disclosure, the display 150 may be implemented with a flexible display. In various embodiments of the present disclosure, the display 150 may also be implemented with a flexible display that can detect and receive touch inputs, e.g., flexible touch screen displays. The display 150 may be implemented by layering stacks of components of the I/O interface 140 for sensing touch inputs or sensor inputs. For example, the display 150 may be configured by placing components of the I/O interface 140 for sensing touch inputs or sensor inputs, made of transparent and flexible materials, on the top or bottom or in the middle. In that case, the display 150 may also serve as the input interface 140, detecting the inputs thereon. In various embodiments of the present disclosure, the display 150 may be implanted to be flexible. In that case, the electronic device may detect a bent region on the display 150. For example, when a bending occurs in a particular region of the display 150, the electronic device may detect the coordinates from the bent region and the bent angle. A more detailed description will be provided later referring to the accompanying drawings.

The communication interface 160 may communicate between the electronic device 101 and an external system (e.g., an electronic device 104 or server 106). For example, the communication interface 160 connects to a network 162 in wireless or wired mode and communicates with the external system. Wireless communication may include at least one of Wi-Fi, Bluetooth (BT), near field communication (NFC), global positioning system (GPS) or cellular communication (e.g., long term evolution (LTE), LTE-advanced (LTE-A), code division multiple access (CDMA), wideband CDMA (WCDMA), universal mobile telecommunications system (UMTS), wireless broadband (Wi-Bro), global system for mobile communications (GSM), etc.). Wired communication may include at least one universal serial bus (USB), high definition multimedia interface (HDMI), recommended standard 232 (RS-232), plain old telephone service (POTS), etc.

In an embodiment of the present disclosure, the network 162 may be a telecommunication network. The telecommunication network may include at least one of a computer network, the Internet, the Internet of things, a telephone network, etc. The protocol for communication between the electronic device 101 and the external system, e.g., transport layer protocol, data link layer protocol, or physical layer protocol, may be supported by at least one of the application module 134, the API 133, the middleware 132, the kernel 131 and the communication module 160.

The application control module 170 may process at least part of information acquired from other components (e.g., the processor 120, the memory 130, the I/O interface 140, the communication interface 160, etc.), and provide them to the user in various methods. For example, the application control module 170 may detect information regarding access parts of the electronic device 101, store information regarding the access parts in the memory 130, and execute the application module 134 based on the information regarding access parts.

Figure 2:
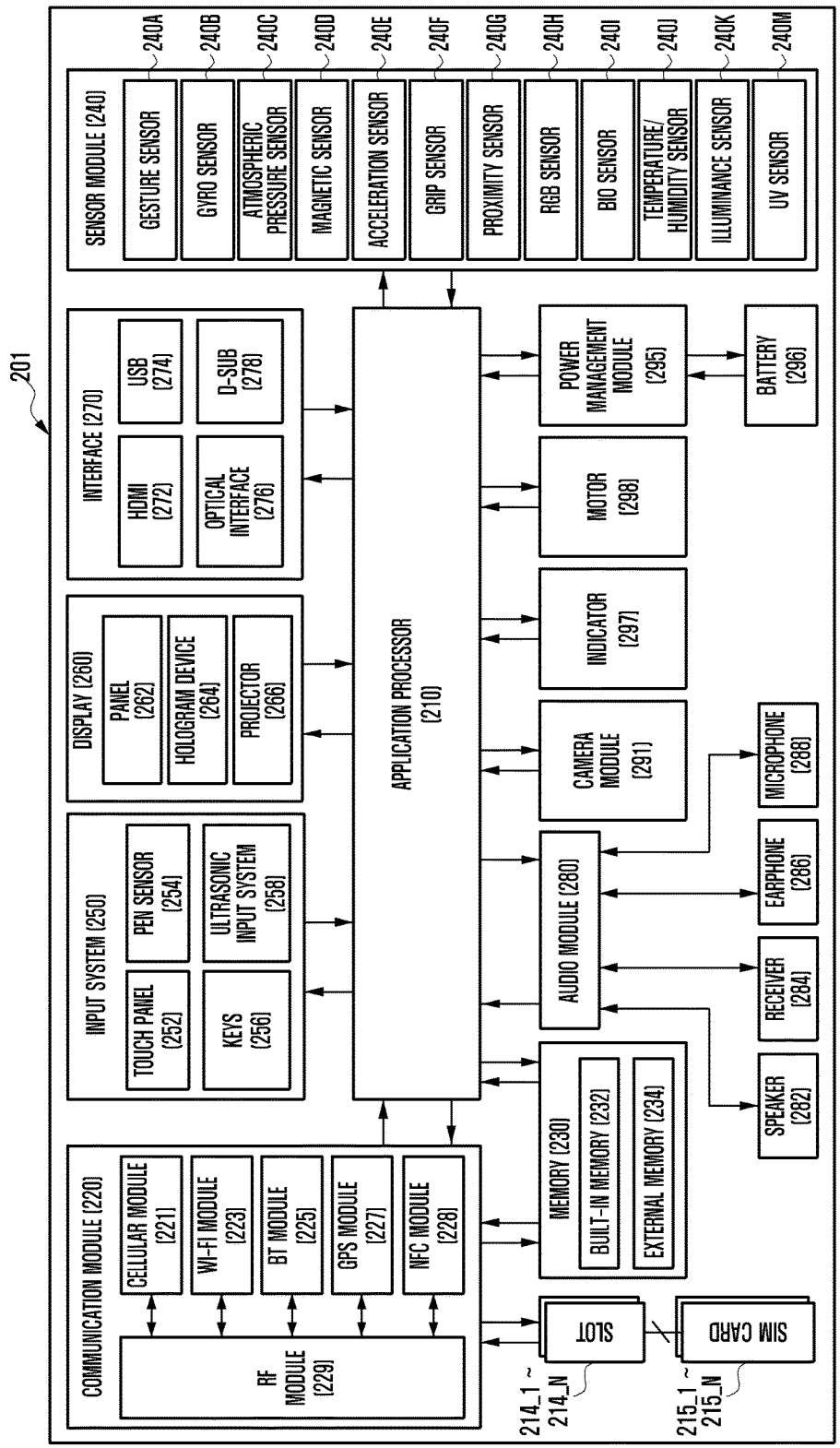
FIG. 2 illustrates a schematic block diagram of an electronic device according to an embodiment of the present disclosure.

FIG. 2 illustrates a schematic block diagram of an electronic device according to an embodiment of the present disclosure. The electronic device 201 may be part or all of electronic device 101 as shown in FIG. 1.

Referring to FIG. 2, the electronic device 201 may include one or more processors of an application processor 210, a communication module 220, at least one subscriber identity module (SIM) card slot 214_1~214_N, at least one subscriber identification module (SIM) card 215_1~215_N, a memory 230, a sensor module 240, an input system 250, a display 260, an interface 270, an audio module 280, a camera module 291, a power management module 295, a battery 296, an indicator 297, and a motor 298.

The application processor (AP) 210 may control a number of hardware or software components connected thereto by executing the operation system or applications, process data including multimedia data, and perform corresponding operations. The AP 210 may be implemented with a system on chip (SoC). In an embodiment of the present disclosure, the AP 210 may further include a graphic processing unit (GPU).

The communication module 220 (e.g., communication interface 160) performs communication for data transmission/reception between the electronic device 201 (e.g., electronic device 101) and other electronic devices (e.g., an electronic device 104, server 106, etc.) via a network. In an embodiment of the present disclosure, the communication module 220 may include a cellular module 221, a Wi-Fi module 223, a BT module 225, a GPS module 227, an NFC module 228 and a radio frequency (RF) module 229.

The cellular module 221 may provide voice call, video call, SMS or Internet service, etc., via a communication network (e.g., LTE, LTE-A, CDMA, WCDMA, UMTS, Wi-Bro, GSM, etc.). The cellular module 221 may perform identification or authentication for electronic devices in a communication network by using their SIM (e.g., SIM card 214). In an embodiment of the present disclosure, the cellular module 221 may perform part of the functions of the AP 210. For example, the cellular module 221 may perform part of the functions for controlling multimedia.

In an embodiment of the present disclosure, the cellular module 221 may include a communication processor. The cellular module 221 may be implemented with, for example, an SoC. Although the embodiment of the present disclosure shown in FIG. 2 is implemented in such a way that the cellular module 221 (e.g., communication processor), the power management module 295, the memory 230, etc., are separated from the AP 210, it can be modified in such a way that the AP 210 includes at least part of those (e.g., cellular module 221).

In an embodiment of the present disclosure, the AP 210 or the cellular module 221 (e.g., communication processor) loads instructions or data transmitted from at least one of non-volatile memory or other components, on volatile memory and then processes them. The AP 210 or the cellular module 221 stores data in a non-volatile memory which is transmitted from/created in at least one of the other components.

The Wi-Fi module 223, the BT module 225, the GPS module 227 and the NFC module 228 may include processors for processing transmission/reception data, respectively. Although the embodiment of the present disclosure shown in FIG. 2 is implemented in such a way that the cellular module 221, Wi-Fi module 223, BT module 225, GPS module 227, and NFC module 228 are separated from each other, it can be modified in such a way that part of those (e.g., two or more) are included in an integrated chip (IC) or an IC package. For example, part of the processors corresponding to the cellular module 221, Wi-Fi module 223, BT module 225, GPS module 227, and NFC module 228, e.g., a communication processor corresponding to the cellular module 221 and a Wi-Fi processor corresponding to the Wi-Fi 233, may be implemented with an SoC.

The radio frequency (RF) module 229 may transmit or receive data, e.g., RF signals. The RF module 229 may include a transceiver, a power amplifier module (PAM), a frequency filter, a low noise amplifier (LNA), etc. The RF module 229 may also include parts for transmitting/receiving electromagnetic waves, e.g., conductors, wires, etc., via free space during wireless communication. Although the embodiment of the present disclosure shown in FIG. 2 is implemented in such a way that the cellular module 221, Wi-Fi module 223, BT module 225, GPS module 227, and NFC module 228 share the RF module 229, it can be modified in such a way that at least one of those transmits or receives RF signals via a separate RF module.

The SIM cards 215_1 to 215_N may be cards with SIMs. The SIM cards 215_1 to 215_N may be fitted into slots 214_1 to 214_N of the electronic device. The SIM cards 215_1 to 215_N may include unique identification information, e.g., integrated circuit card identifier (ICCID), or subscriber information, e.g., international mobile subscriber identity (IMSI).

The memory 230 (e.g., memory 130) may include a built-in memory 232 and/or external memory 234. The built-in memory 232 may include at least one of a volatile memory, e.g., dynamic random access memory (DRAM), static RAM (SRAM), synchronous DRAM (SDRAM), etc., and a non-volatile memory, e.g., one time programmable read only memory (OTPROM), programmable ROM (PROM), erasable and programmable ROM (EPROM), electrically erasable and programmable ROM (EEPROM), mask ROM, flash ROM, not and (NAND) flash memory, not or (NOR) flash memory, etc.

In an embodiment of the present disclosure, the built-in memory 232 may be a Solid State Drive (SSD). The external memory 234 may further include a flash drive, e.g., compact flash (CF), secure digital (SD), micro-SD, mini-SD, extreme digital (XD), a memory stick, etc. The external memory 234 may be functionally connected to the electronic device 200 via various types of interfaces. In an embodiment of the present disclosure, the electronic device 201 may further include storage devices such as hard drives.

The sensor module 240 may measure a physical quantity or sense operation states of the electronic device 200 and convert the measured or sensed data to electrical signals. The sensor module 240 may include at least one of to gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red-green-blue (RGB) sensor), a biosensor 240I, a temperature/humidity sensor 240J, an illuminance sensor 240K, and an ultra-violet (UV) sensor 240M. The sensor module 240 may also include an e-nose sensor, electromyography (EMG) sensor, an electroencephalogram (EEG) sensor, an electrocardiogram (ECG) sensor, Infra-Red (IR) sensor, a fingerprint sensor, iris sensor, etc. The sensor module 240 may further include a control circuit for controlling one or more sensors.

The input system 250 may include a touch panel 252, a pen sensor 254 (i.e., a digital pen sensor), a key 256 and an ultrasonic input system 258. The touch panel 252 may sense touches by at least one of capacitive sensing, pressure sensing, infrared sensing, and ultrasonic sensing. The touch panel 252 may further include a control circuit. When the touch panel 252 is designed to operate in capacitive sensing mode, it can sense mechanical/physical touches or proximity of an object. The touch panel 252 may further include a tactile layer. In that case, the touch panel 252 can provide tactile feedback to the user.

The pen sensor 254 (i.e., digital pen sensor) may be implemented in the same or similar fashion as receiving a user's touch input or by using a separate recognition sheet. The key 256 may include mechanical buttons, optical keys or a key pad. The ultrasonic input system 258 is a device that can sense sounds via a microphone 288 of the electronic device 200 by using an input tool for generating ultrasonic signals and can check the data. The ultrasonic input system 258 can sense signals in a wireless mode. In an embodiment of the present disclosure, the electronic device 200 may receive a user's inputs from an external system (e.g., a computer or server) via the communication module 220.

The display 260 (e.g., display 150) may include a panel 262, a hologram unit 264, or a projector 266. The panel 262 may be implemented with a Liquid Crystal Display (LCD), Active Matrix Organic Light Emitting Diodes (AMOLEDs), or the like. The panel 262 may be implemented in a flexible, transparent, or wearable form. The panel 262 may form a single module with the touch panel 252. The hologram unit 264 shows a three-dimensional image in the air using interference of light. The projector 226 may display images by projecting light on a screen. The screen may be placed, for example, inside or outside the electronic device 200. In an embodiment of the present disclosure, the display 260 may further include a control circuit for controlling the panel 262, the hologram unit 264, or the projector 266. In various embodiments of the present disclosure, the display 260 may be layered with the input system 250, forming a stack structure. For example, the display 260 may be configured by placing the input system 250, transparent and flexible, on the top, bottom, or in the middle. In that case, the display 260 may also serve as the input system 250, detecting the inputs thereon. In various embodiments of the present disclosure, the display 260 may be implanted to be flexible. In that case, the electronic device may detect a bent region on the display 260. For example, when a bending occurs in a particular region of the display 260, the electronic device may detect the coordinates from the bent region and the bent angle. A more detailed description will be provided later referring to the accompanying drawings.

The interface 270 may include an HDMI 272, a USB 274, an optical interface 276, a D-subminiature (D-sub) 278, etc. The interface 270 may also be included in the communication interface 160 shown in FIG. 1. The interface 270 may also include a mobile high-media card (MHL) interface, an SD card, a multi-media card (MMC) interface, an infrared data association (IrDA) interface, or the like.

The audio module 280 may make conversion between audios and electrical signals. At least part of the components in the audio module 280 may be included in the I/O interface 140 shown in FIG. 1. The audio module 280 may process audio signals output from/input to, for example, a speaker 282, a receiver 284, earphones 286, the microphone 288, etc.

The camera module 291 may take still images or moving images. In an embodiment of the present disclosure, the camera module 291 may include one or more image sensors (e.g., on front side and/or back side), a lens, an image signal processor (ISP), a flash (e.g., LED or a xenon lamp), or the like.

The power management module 295 may manage electric power of the electronic device 200. The power management module 295 may include a power management IC (PMIC), a charger IC, a battery or fuel gauge, etc.

The PMIC may be implemented in the form of an IC chip or an SoC. Charging using electric power may be performed in wired or wireless mode. The charger IC may charge a battery, preventing input over-voltage or input over-current from inputting to the battery from a charger. In an embodiment of the present disclosure, the charger IC may be implemented with wired charging type and/or wireless charging type. Examples of the wireless charging type of charger IC are a magnetic resonance type, a magnetic induction type, an electromagnetic type, etc. If the charger IC is a wireless charging type, it may include an additional circuit for wireless charging, e.g., a coil loop unit, a resonance circuit, a rectifier, etc.

The battery gauge may measure the residual amount of battery 296, the level of voltage, the level of current, temperature during the charge. The battery 296 charges electric power and supplies it to the electronic device 200. The battery 296 may include a rechargeable battery or a solar battery.

The indicator 297 shows states of the electronic device 200 or of the parts (e.g., AP 210), e.g., a booting state, a message state, a recharging state, etc. The motor 298 converts an electrical signal into a mechanical vibration. Although it is not shown, the electronic device 200 may include a processor for supporting a mobile TV, e.g., a GPU. The processor may process media data that comply with standards of digital multimedia broadcasting (DMB), digital video broadcasting (DVB), media flow, etc.

Each of the elements/units of the electronic device according to the present disclosure may be implemented with one or more components, and be called different names according to types of electronic devices. The electronic device according to the present disclosure may include at least one element described above. The electronic device may be modified in such a way as to remove part of the elements or include new elements. In addition, the electronic device according to the present disclosure may also be modified in such a way that parts of the elements are integrated into one entity that performs their original functions.

In the present disclosure, the terminology '~ module' refers to a 'unit' including hardware, software, firmware or a combination thereof. For example, the terminology '~ module' is interchangeable with '~ unit,' '~ logic,' '~ logical block,' '~ component,' '~ circuit,' etc. A 'module' may be the least unit or a part of an integrated component. A 'module' may be the least unit or a part thereof that can perform one or more functions. A 'module' may be implemented in mechanical or electronic mode. For example, 'modules' according to the present disclosure may be implemented with at least one of an application specific IC (ASIC) chip, a field-programmable gate array (FPGAs) and a programmable-logic device that can perform functions that are known or will be developed.

In an embodiment of the present disclosure, an electronic device includes a flexible display for displaying screen display data, detecting a user input, and detecting information about a portion and an angle of a bent area, a memory for storing data for compensating bent regions of the flexible display, and a processor for creating data to be displayed on the flexible display, controlling the flexible display to display the data, determining, when detecting a user input from the flexible display, whether the flexible display includes a bent area, calculating, when the flexible display includes a bent area, coordinates from the bent area and the bent angle, compensating data displayed on the bent area with preset compensation, and displaying the data on the flexible display.

In an embodiment of the present disclosure, an electronic device for controlling a flexible display of an electronic device includes a flexible display for displaying screen display data, detecting a user input, and detecting information about a portion and an angle of a bent area, a memory for storing data for compensating bent regions of the flexible display, and a processor for determining, after creating screen display data to be displayed on the flexible display, whether the flexible display includes a bent area, calculating, when the flexible display includes a bent area, coordinates from the bent area and the bent angle, and compensating data displayed on the bent area with preset compensation and displaying the data on the flexible display.

Figure 3:
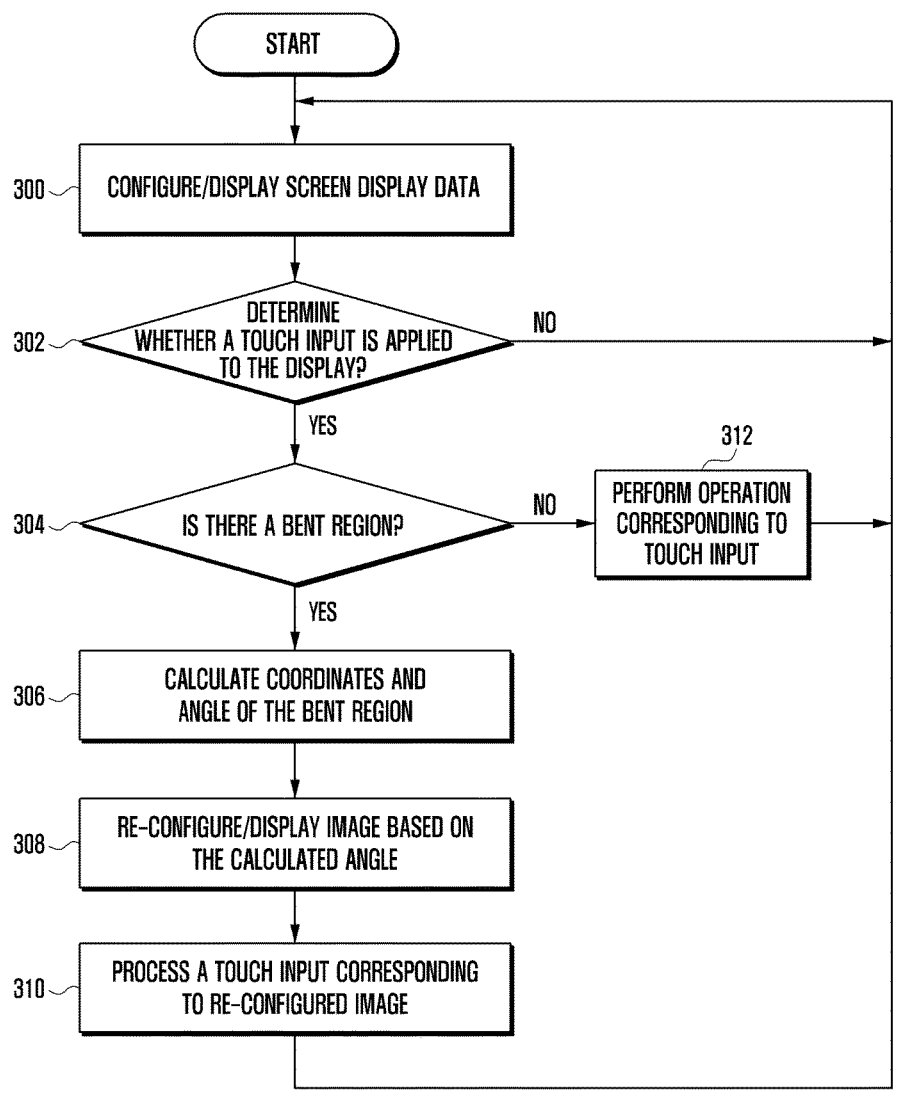
FIG. 3 is a flowchart of a method for controlling a flexible display of an electronic device according to an embodiment of the present disclosure.

FIG. 3 is a flowchart of a method for controlling a flexible display of an electronic device according to an embodiment of the present disclosure.

In the following description, the flowchart shown in FIG. 3 will be described referring to the block diagram of an electronic device shown in FIG. 1. In this case, the display 150 may be implemented to be flexible and to detect touch inputs or hover inputs, i.e., as a flexible display (or a flexible touch screen display). The display 150 may be implemented to include part of the I/O interface 140, i.e., as a flexible display (or a flexible touch screen display). In the following description, it will be described that the processor 120 processes data to be displayed on the flexible display 150. However, it should be understood that the following embodiments of the present disclosure may be implemented to further include a control circuit or module for performing the operations of the processor 120.

In the following description, the flowchart shown in FIG. 3 will be described based on touch inputs as an example of inputs applied to the display 150. It should be understood, however, that the present disclosure is not limited to the described embodiment. Rather, it may be modified in such a way as to operate by various types of inputs such as hover inputs, inputs by a styles pen, etc.

Referring to FIG. 3, the processor 120 may configure screen display data and display it on the display 150 at operation 300. For example, the screen display data may be data related to a standby state, a start screen state, screens of an application when it is operated, etc.

After displaying a screen on the display 150, the processor 120 determines whether a touch input is applied to the display 150 at operation 302. When the processor 120 ascertains that a touch input is applied to the display 150 at operation 302, for example, when it receives a signal corresponding to a touch input from a component of the I/O interface 140 layered with the display 150, it determines whether the display 150 includes a bent region at operation 304. On the contrary, when the processor 120 ascertains that a touch input is not applied to the display 150 at operation 302, i.e., when it does not receive a signal corresponding to a touch input, it returns to operation 300. It should be understood that the various embodiments of the present disclosure do not consider the other inputs, e.g., an input for taking an incoming call of the communication interface 160, an input for processing messages, such as text messages and push messages, inputs for operating keys, etc. It should be, however, understood that hover inputs, inputs by a stylus pen, etc., may be applied to the embodiment of FIG. 3 in the same or in a similar manner as the touch input described above.

When the processor 120 ascertains that the display 150 does not include a bent region at operation 304, it performs an operation corresponding to the touch input at operation 312. For example, if it is determined that the touch has been made at operation 302 to execute an application or a widget, to move to a particular page, to select an icon, etc. during the execution of an application, or the like, the processor 120 performs the corresponding operation at operation 312. After that, the processor 120 returns to operation 300.

On the contrary, when the processor 120 ascertains that the display 150 includes a bent region at operation 304, it calculates the coordinates and angle in the bent region at operation 306. The bent region may be calculated by coordinates, from x11 to x12 and from y11 to y12, with respect to x- and y-axes, respectively. This is described as follows, referring to FIGS. 4A to 4E.

FIGS. 4A, 4B, 4C, 4D, and 4E are diagrams that describe states of a flexible display with touches applying thereto according to various embodiments of the present disclosure.

Figure 4A:
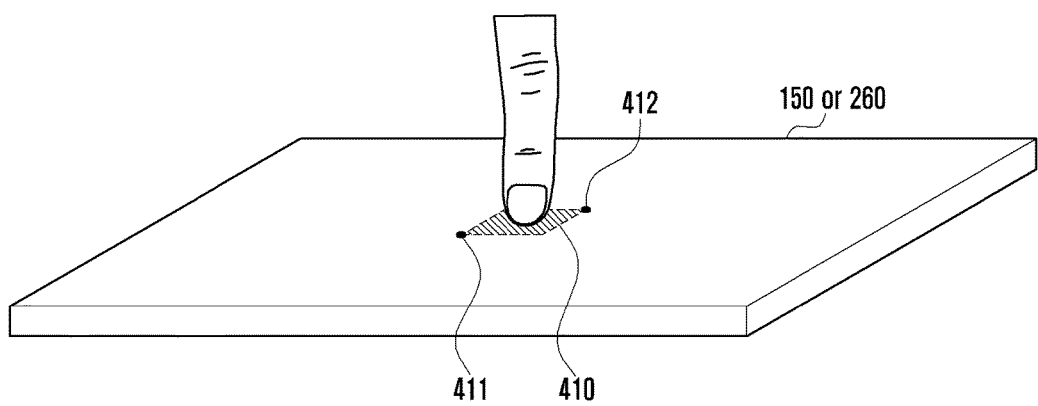
FIGS. 4A, 4B, 4C, 4D, and 4E are diagrams that describe states of a flexible display with touches applied thereto according to various embodiments of the present disclosure.

Referring to FIG. 4A, a flexible display 150 or 260 that is not in a bent state is illustrated. In the following description, the flexible display will be described with the reference number 150. It should be understood that the flexible display may include a sensor (e.g., a touch input sensor) that senses various inputs (e.g., touch inputs (such as a touch and drag, a pinch for zooming in/out, etc.), hover inputs, inputs by a stylus pen, etc.).

When the flexible display 150 is in a flat state as shown in FIG. 4A, the user can apply a touch to an area 410 that he/she wants to touch, e.g., an area where an icon is located. In the following description, it is assumed that the area 410 that a user wants to touch is an area 410 where an icon is located, short for an icon area 410. When the user touches an icon area 410, the touch input sensor may obtain coordinates of points 411 and 412, respectively.

As shown in FIG. 4A, since the various embodiments of the present disclosure are implemented in such a way that the touched area, 410, is shaped as a rectangle, the coordinates of points 411 and 412 are obtained from the vertexes diagonally opposite to each other. In an embodiment of the present disclosure, if a touched area is implemented in a circle, the coordinates may be obtained from the points on the circumference of the circle opposite to each other with respect to the center point of the circle and may have values represented based on the center point and the radii of the circle. In an embodiment of the present disclosure, if a touched area is implemented in a polygon, the coordinates may be obtained from all the vertexes. In the following description referring to FIGS. 4A to 4E, the shape of the touched area on the flexible display 150 is a rectangle.

As shown in FIG. 4A, the two points on the flexible display 150 diagonally opposite to each other may be represented by a width-coordinate and a length coordinate, based on the width axis and the length axis in the direction of the width and length respectively. It may be assumed that the point labeled with 411 has the coordinates, (x1, y1), and the point 412 has coordinates (x2, y2). In that case, the sensor can obtain information about the user's touched area 410 defined by the coordinates of the two points 411 and 412.

Figure 4B:
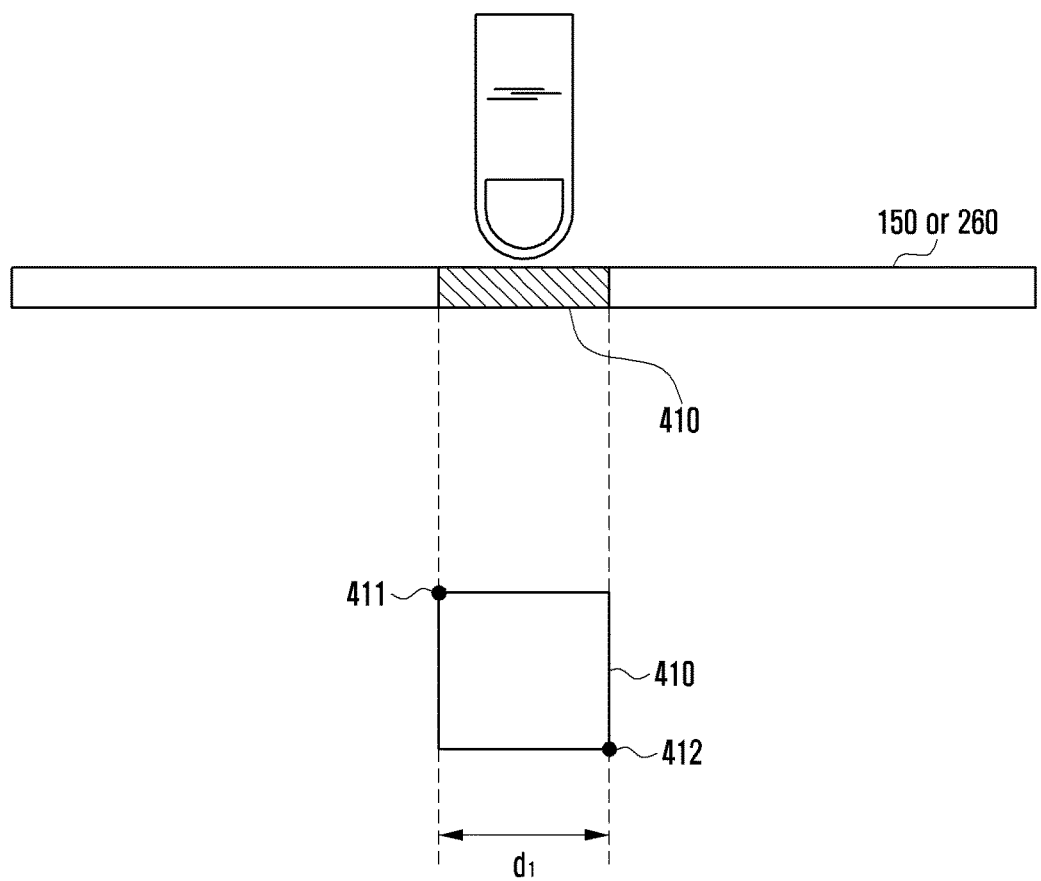

FIG. 4B is a diagram describing the coordinates shown in FIG. 4A, with respect to the flexible display 150. The user's touched area 410 may be defined by coordinates of the two points 411 and 412.

Figure 4C:
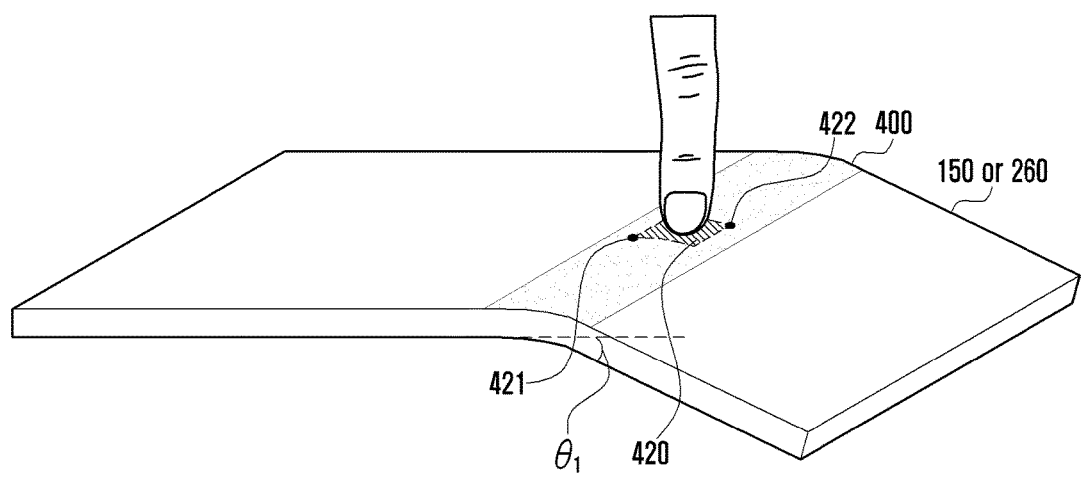

FIG. 4C is a flexible display 150 where a particular region is bent. It may be assumed that the bent region is labeled with 400. Although the embodiment of the present disclosure is described based on one bent region, it should be understood that the present disclosure can also be applied to two or more bent regions.

When the user makes a touch on the bent region 400 as shown in FIG. 4C, he/she has difficulty in applying a correct touch to a corresponding area depend on the bent states, e.g., the direction of bending. For example, it may be assumed that an icon is located in the bent region 400 and detected by a touch applied to a rectangle area 420, short for an icon area 420.

In order to select the icon by a touch, the icon area 420 of a rectangle on the flexible display 150 may be set as an area defined by coordinates of the two vertexes diagonally opposite to each other. As described above, the coordinates are represented by a width-coordinate and a length coordinate, based on the width axis and the length axis in the direction of the width and length respectively. It may be assumed that the point labeled with 421 has the coordinates, (x3, y3), and the point 422 has coordinates (x4, y4). In that case, the sensor can obtain information about the user's touched area 420 defined by the coordinates of the two points 421 and 422.

Figure 4D:
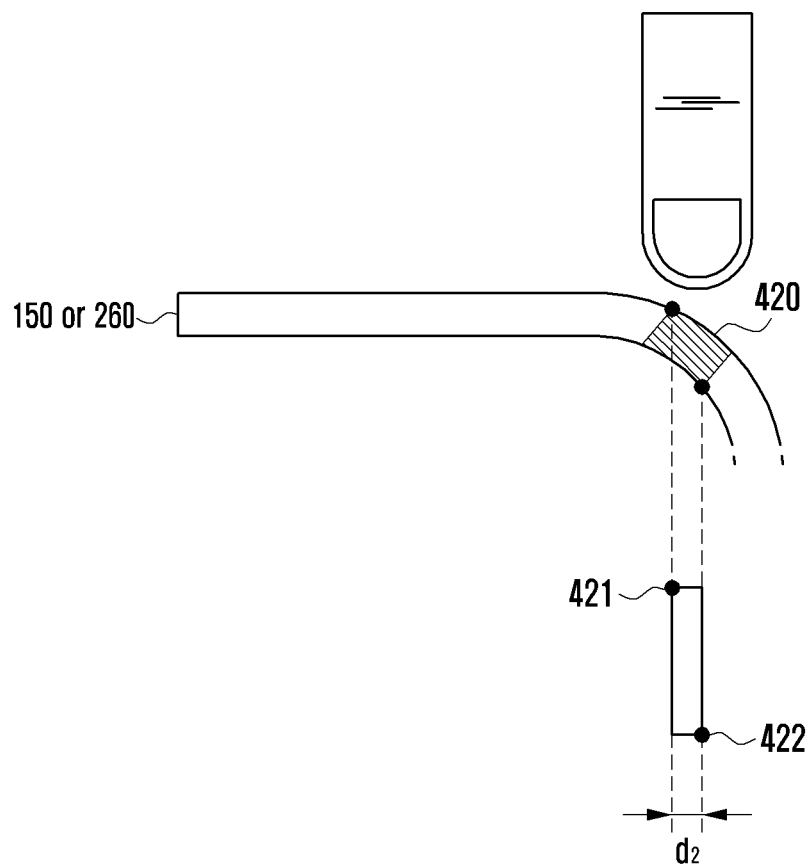

FIG. 4D is a diagram describing the coordinates shown in FIG. 4C, with respect to the flexible display 150. The user's touched area 420 may be defined by coordinates of the two points 421 and 422.

Comparing the state of the flexible display 150 shown in FIG. 4B with that of FIG. 4D, the distance d1 of the icon area 410, which is the difference between the projected y-coordinates shown in FIG. 4B, is greater than the distance d2 of the icon area 420, which is the difference between the projected y-coordinates shown in FIG. 4D. When a touch is made on the bent region 400 shown in FIG. 4D, the sensor may not detect it or make an error.

In order to address the problems, the processor 120 calculates the coordinates from the bent region and the bent angle at operation 306 shown in FIG. 3. To this end, the flexible display 150 includes a sensor for detecting a bent region, e.g., the points for coordinates, and a sensor for detecting the angle of bending. The processor 120 receives sensed data from the sensors for detecting a bent region and a bent angle, and calculates the coordinates and the bent angle of the bent region by using the data.

After calculating the coordinates and the bent angle of the bent region at operation 306, the processor 120 reconfigures the image on the flexible display 150, considering the calculated bent angle at operation 308. For example, the processor 120 may zoom in an image in the bent region or shift/move an image from the bent region to another region, and then display it on the flexible display 150. The processor 120 may also zoom in an image in the bent region and shift/move it from the bent region to another region, and then display it on the flexible display 150. The process of zooming-in or shifting/moving or the process of zooming-in and shifting/moving may display an image in the bent region in the same way as it is displayed on a region not bent or may zoom an image in the bent region in to a similar width as it is displayed on a region not bent. This makes it easier for a user to apply a touch to the bent region.

Figure 4E:
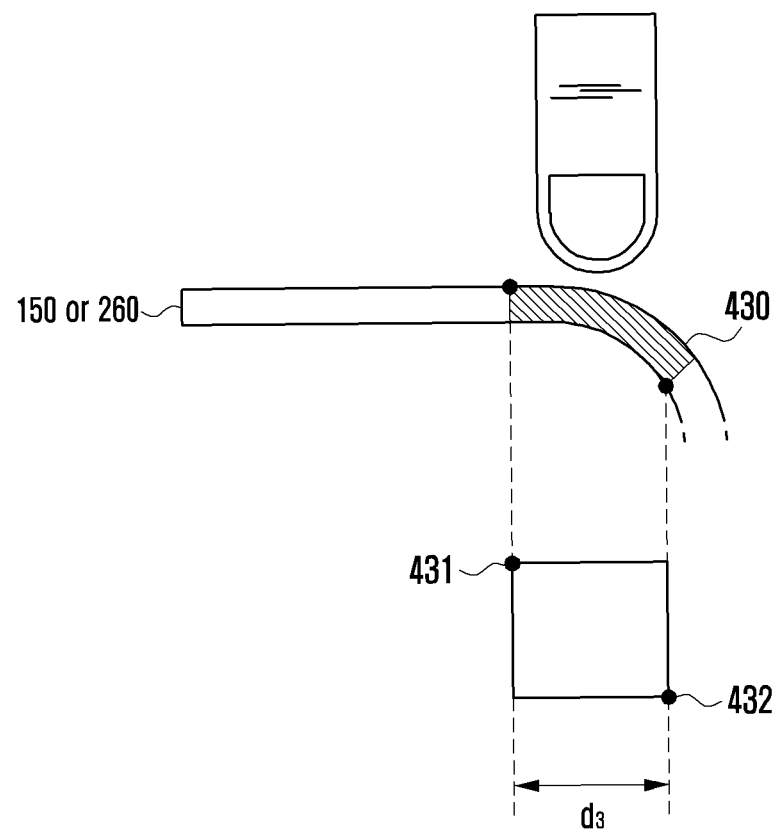

FIG. 4E is a diagram that describes a method where the processor 120 re-calculates a position of an icon at a bent region, and zooms in an image or shifts/moves an image or zooms in an image and shift/move it.

Referring to FIG. 4E, as compared with FIG. 4D, an area of an icon (an icon area 430) in the bent region is processed by zooming-in or shifting/moving or by zooming-in and shifting/moving, thereby creating the distance d3 of the icon area 430, which is the difference between the projected y-coordinates of points 431 and 432. Therefore, the distance d3 of the icon area 430 shown in FIG. 4E can be configured to be identical to or similar to the distance d1 of the icon area 410 shown in FIG. 4B.

In an embodiment of the present disclosure, the processor 120 may calculate values for the process of zooming-in or shifting/moving or the process of zooming-in and shifting/moving, each time, according to bent angles of the flexible display 150. In an embodiment of the present disclosure, the processor 120 may store values in table of the memory, calculated for the process of zooming-in or shifting/moving or the process of zooming-in and shifting/moving. When screen display data in a bent area is shifted according to bent angles of the flexible display 150, amounts of shift in the direction of x- and y-axes may be defined as the following Table 1, for example.

TABLE 1

| Bent angle | Shift in the x-axis direction | Shift in the y-axis direction |
|---|---|---|
| $0° < \theta \leq 10°$ | $X + \alpha 1$ | $Y + \beta 1$ |
| $10° < \theta \leq 20°$ | $X + \alpha 2$ | $Y + \beta 2$ |
| $20° < \theta \leq 30°$ | $X + \alpha 3$ | $Y + \beta 3$ |
| ... | ... | ... |

When amounts of shift in the direction of x- and y-axes according to bent angles of the flexible display are previously defined in a table, as described in Table 1, and the electronic device is equipped with the table, the processor 120 does not need to calculate values for the process of zooming-in or shifting/moving or the process of zooming-in and shifting/moving, each time, but just calculates amounts of shift according to the detected bent angle referring to the table. When the processor 120 shifts screen display data for a particular area in a bent region, referring to Table 1, it may configure it, assuming that the configured data is displayed on a region that is not bent.

Although Table 1 shows only the physical quantities, amounts of shift and bent angle, it should be understood that it may also include the physical quantities related to the process of zooming-in (or shifting/moving) and the process of zooming-in and shifting/moving. In that case, the table may include a field of zoom-in ratios for the zooming in process, and a field of values calculated by zoom-in ratio and amount of shift for the process where the zooming-in and shifting/moving are simultaneously performed.

In the following description, the table that the processor 120 refers to when performing the process of zooming-in or shifting/moving and the process of zooming-in and shifting/moving is called a compensation table.

Therefore, the processor 120 reconfigures screen display data for the bent areas according to angles of bending referring to the compensation table and displays the reconfigured data on the flexible display 150 at operation 308.

After that, the processor 120 detects a touch input on an area and performs an operation corresponding to the touch at operation 310. When the processor 120 detects a touch input on the same area at operation 310, it may perform a user's requested operation by using the information about the same area that the user touched again at operation 310. After performing operations at operation 310, the processor 120 returns to operation 300.

Figure 5:
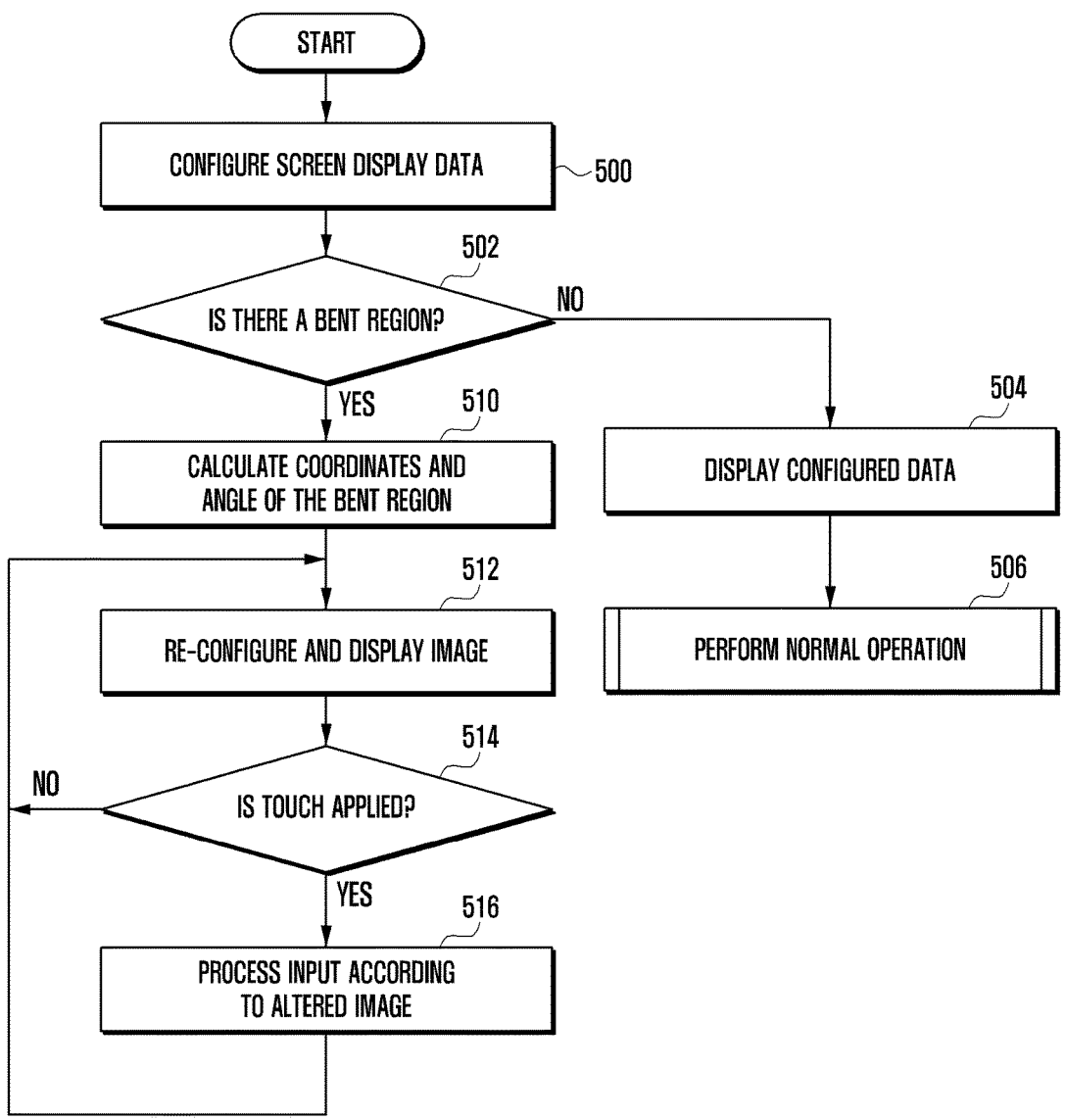
FIG. 5 is a flowchart of a method for controlling a flexible display of an electronic device according to various embodiments of the present disclosure.

FIG. 5 is a flowchart that describes a method for controlling a flexible display of an electronic device according to various embodiments of the present disclosure.

The flowchart shown in FIG. 5 will be described referring to the block diagram of an electronic device shown in FIG. 1.

Referring to FIG. 5, the processor 120 may configure screen display data at operation 500. The screen display data may be data to be displayed on the flexible display 150. For example, the screen display data may be data related to a standby screen, a home screen, screens of an application when it is operated, etc.

Before immediately displaying the configured screen display data on the flexible display 150, the processor 120 determines whether the flexible display 150 include a bent region at operation 502. Since the determination as to whether the flexible display 150 includes a bent region has been described above, its detailed description is omitted.

When the processor 120 ascertains that the flexible display 150 does not include a bent region at operation 502, it displays the configured screen display data on the flexible display 150 at operation 504, and then performs normal operations at operation 506.

On the contrary, when the processor 120 ascertains that the flexible display 150 includes a bent region at operation 502, it calculates the bent angle and the coordinates from the bent region at operation 510. Since the calculation of the coordinates from the bent area has been described above, its detailed description is omitted.

After that, the processor 120 may re-configure an icon in the bent area to perform the process of shifting/moving or zooming-in or the process of shifting/moving and zooming-in at operation 512. The processor 120 may obtain bent angles and coordinates for the bent areas each time that it performs re-configuration, and calculate values for the process of zooming-in or shifting/moving or the process of zooming-in and shifting/moving, according to bent angles of the flexible display 150. The processor 120 may also use the compensation table described above. In the following description, the embodiment of the present disclosure is described based on a case using the compensation table.

After reconfiguring the image for the screen display data referring to Table 1 at operation 512, the processor 120 displays it on the flexible display 150. The processor 120 performs the process of zooming-in or shifting/moving or the process of zooming-in and shifting/moving for the bent area before the user applies a touch to the bent area.

After that, the processor 120 determines whether a touch input is applied to the flexible display 150 at operation 514. When the processor 120 ascertains that a touch input is applied to the flexible display 150 at operation 514, it processes the input value according to the altered image at operation 516 and then returns to operation 512. On the contrary, when the processor 120 ascertains that a touch input is not applied to the flexible display 150 at operation 514, it returns to operation 512. In an embodiment of the present disclosure, when the processor 120 ascertains that a touch input is not applied to the flexible display 150 at operation 514, it may retain the reconfigured image for a preset period of time, e.g., 3 or 5 seconds. This is to prevent loss of the image while it is processed by reconfiguring and displaying.

In an embodiment of the present disclosure, a method for controlling a flexible display of an electronic device including determining, when a user input is made while screen display data is displayed on the flexible display, whether the flexible display includes a bent area, calculating, when the flexible display includes a bent area, coordinates from the bent area and the bent angle, and compensating data displayed on the bent area with preset compensation and displaying the data.

In an embodiment of the present disclosure, a method for controlling a flexible display of an electronic device including determining, after creating screen display data to be displayed on the flexible display, whether the flexible display includes a bent area, calculating, when the flexible display includes a bent area, coordinates from the bent area and the bent angle, and compensating data displayed on the bent area with preset compensation and displaying the data.

As described above, the flexible display controlling method according to various embodiments of the present disclosure and the electronic device adapted to the method can allow users to zoom-in and/or shift/move on a bent portion (area) when they need to check the contents on the bent portion (area) and to make an input thereto, according to the extent of bending, so that users can easily see the contents on and also easily make inputs to the display.

As described above, part of the method (e.g., operations) or system (e.g., modules or functions) according to the present disclosure can be implemented with command instructions that can be conducted via various types of computers and stored in computer-readable storage media, as types of programming modules, for example. One or more processors (e.g., processor 210) can execute commend instructions, thereby performing the functions. An example of the computer-readable storage media may be memory 220. At least part of the programming modules can be implemented (executed) by processor 210, for example. At least part of the programming module includes modules, programs, routines, sets of instructions or processes, etc., for example, in order to perform one or more functions.

Examples of computer-readable media include magnetic media, such as hard disks, floppy disks, and magnetic tape, optical media such as compact disc ROM (CD-ROM) disks and DVDs, magneto-optical media, such as floptical disks, and hardware devices that are specially configured to store and perform program instructions (programming modules), such as ROM, RAM, flash memory, etc. Examples of program instructions include machine code, such as produced by a compiler, and files containing higher level code that may be executed by the computer using an interpreter. The described hardware devices may be configured to act as one or more software modules in order to perform the operations and methods described above, or vice versa.

Modules or programming modules according to the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a flexible display of an electronic device, the method comprising:
   determining, when a user input is made while screen display data is displayed on the flexible display, whether the flexible display includes a bent area;
   determining, when the flexible display includes the bent area, coordinates from the bent area and a bent angle;
   when the user input is made on the coordinates from the bent area, compensating the user input with preset compensation based on the bent angle;
   compensating the data displayed on the bent area with preset compensation; and
   displaying the data.

2. The method of claim 1, wherein the compensating of the data displayed on the bent area with preset compensation comprises at least one of:
   zooming in the data in the bent area to the same value or a similar value as it is displayed on a region not bent;
   shifting/moving the data in the bent area to a region as it is displayed on a region not bent; or
   zooming in the data in the bent area to the same value or a similar value and shifting/moving the data in the bent area to a region as it is displayed on a region not bent.

3. The method of claim 2, wherein the compensating of the data displayed on the bent area with preset compensation further comprises:
   compensating data displayed on the bent area with data that corresponds to bent angles and are stored in a compensation table, in order to perform zooming in the data in the bent area, shifting/moving the data in the bent area, or zooming in and shifting/moving the data in the bent area.

4. The method of claim 1, further comprising: performing an operation corresponding to a touch input in a state where the data displayed on the bent area is compensated with the compensated data and displayed on a region.

5. The method of claim 1, wherein the user input comprises at least one of:
   a touch input, an input by a stylus pen, or a hover input.

6. A method for controlling a flexible display of an electronic device, the method comprising:
   determining, after creating screen display data to be displayed on the flexible display, whether the flexible display includes a bent area;
   calculating, when the flexible display includes the bent area, coordinates from the bent area and a bent angle;
   compensating user input received on the bent area with preset compensation based on the bent angle;
   compensating data displayed on the bent area with preset compensation; and
   displaying the data.

7. The method of claim 6, wherein the compensating of the data displayed on the bent area with preset compensation comprises at least one of:
   zooming in the data in the bent area to the same value or a similar value as it is displayed on a region not bent;
   shifting/moving the data in the bent area to a region as it is displayed on a region not bent; or
   zooming in the data in the bent area to the same value or a similar value and shifting/moving the data in the bent area to a region as it is displayed on a region not bent.

8. The method of claim 7, wherein the compensating of the data displayed on the bent area with preset compensation further comprises:
   compensating data displayed on the bent area with data that corresponds to bent angles and are stored in a compensation table, in order to perform zooming in the data in the bent area, shifting/moving the data in the bent area, or zooming in and shifting/moving the data in the bent area.

9. The method of claim 6, further comprising: performing an operation corresponding to a touch input in a state where the data displayed on the bent area is compensated with the compensated data and displayed on a region.

10. The method of claim 6, wherein the user input comprises at least one of:
    a touch input, an input by a stylus pen, or a hover input.

11. An electronic device comprising:
    a flexible display configured to:
        display screen display data,
        detect a user input, and
        detect information about a portion and an angle of a bent area;
    a memory configured to store data for compensating bent regions of the flexible display; and
    at least one processor configured to:
        create data to be displayed on the flexible display, control the flexible display to display the data,
determine, when detecting a user input from the flexible display, whether the flexible display includes the bent area,
calculate, when the flexible display includes the bent area, coordinates from the bent area and a bent angle,
when the user input is made on the coordinates from the bent area, compensate the user input with preset compensation based on the bent angle,
compensate data displayed on the bent area with preset compensation, and
display the data on the flexible display.

12. The electronic device of claim 11, wherein the at least one processor is further configured to compensate data displayed on the bent area with preset compensation by performing at least one of:
zooming in the data in the bent area to the same value or a similar value as it is displayed on a region not bent,
shifting/moving the data in the bent area to a region as it is displayed on a region not bent, or
zooming in the data in the bent area to the same value or a similar value and shifting/moving the data in the bent area to a region as it is displayed on a region not bent.

13. The electronic device of claim 12, wherein the memory is further configured to store data in a compensation table in order to perform at least one of:
zooming in the data in the bent area,
shifting/moving the data in the bent area, or
zooming in and shifting/moving the data in the bent area.

14. The electronic device of claim 11, wherein the at least one processor is further configured to perform an operation corresponding to a touch input in a state where the data displayed on the bent area is compensated with the compensated data and displayed on a region.

15. The electronic device of claim 11, wherein the user input comprises at least one of:
a touch input, an input by a stylus pen, or a hover input.

16. An electronic device for controlling a flexible display of an electronic device, the electronic device comprising:
a flexible display configured to:
display screen display data,
detect a user input, and
detect information about a portion and an angle of a bent area;
a memory configured to store data for compensating bent regions of the flexible display; and
at least one processor configured to:
determine, after creating screen display data to be displayed on the flexible display, whether the flexible display includes the bent area,
calculate, when the flexible display includes the bent area, coordinates from the bent area and a bent angle,
when the user input is made on the coordinates from the bent area, compensate the user input with preset compensation based on the bent angle,
compensate data displayed on the bent area with preset compensation, and
display the data on the flexible display.

17. The electronic device of claim 16, wherein the at least one processor is further configured to compensate data displayed on the bent area with preset compensation by performing at least one of:
zooming in the data in the bent area to the same value or a similar value as it is displayed on a region not bent,
shifting/moving the data in the bent area to a region as it is displayed on a region not bent, or
zooming in the data in the bent area to the same value or a similar value and shifting/moving the data in the bent area to a region as it is displayed on a region not bent.

18. The electronic device of claim 17, wherein the memory is further configured to store data in a compensation table in order to perform at least one of:
zooming in the data in the bent area,
shifting/moving the data in the bent area, or
zooming in and shifting/moving the data in the bent area.

19. The electronic device of claim 16, wherein the at least one processor is further configured to perform an operation corresponding to a touch input in a state where the data displayed on the bent area is compensated with the compensated data and displayed on a region.

20. The electronic device of claim 16, wherein the user input comprises at least one of:
a touch input, an input by a stylus pen, or a hover input.

* * * * *